United States Patent Office 3,288,620
Patented Nov. 29, 1966

3,288,620
WAX COMPOSITIONS OF IMPROVED HARDNESS AND TENSILE STRENGTH AND PROCESS FOR PREPARING SAME
Richard F. Lippoldt, Ponca City, Okla., assignor to Continental Oil Company, Ponca City, Okla., a corporation of Oklahoma
No Drawing. Filed Jan. 21, 1963, Ser. No. 252,561
11 Claims. (Cl. 106—271)

This invention relates to paraffin wax compositions which are characterized by improved hardness and tensile strength, and which display less tendency to gel as a result of the incorporation in the wax of certain additives for improving the hardness and tensile strength thereof. The invention further relates to the method of preparing such compositions. More particularly, but not by way of limitation, the present invention relates to a new use as an additive for paraffin waxes of known polymeric compounds produced in the process of this invention by the reaction of polycarboxylic acids with water and aluminum alkoxides.

It has previously been known to add fatty acid salts of aluminum, such as aluminum stearate, to waxes for the purpose of improving the penetration and tensile strength properties of the wax. Although the use of such additives does effectively reduce or eliminate problems associated with low tensile strength and lack of hardness, the incorporation of such additives in the wax gives rise to a different problem. The disadvantage which has been experienced in the use of such additives is that they induce a tendency in the molten wax to gel and lose fluidity. The gelling tendency, of course, decreases the facility with which the molten wax may be poured or otherwise handled.

The present invention provides new wax compositions which include as additives polymeric aluminum salts of a type which have heretofore been generally known and recognized, but whose usefulness was not perceived to extend to incorporation in paraffin waxes for the purpose of improving tensile strength and hardness. It has been found that such polymeric aluminum salts not only produce a substantial improvement in the tensile strength and hardness properties of the paraffin wax in which they are incorporated, but that wax compositions including such additives exhibit little or no tendency to gel and thus avoid the primary difficulty which has characterized the use of fatty acid aluminum salts heretofore.

In accordance with this invention, the term paraffin wax contemplates those waxy materials derived from crude petroleum which are physically characterized by crystallizing into large, well-formed distinct crystals of the plate and needle types and which have been refined to the extent that they contain less than about two percent oil content.

The process of the present invention broadly comprises admixing a polycarboxylic acid, water and an aluminum alkoxide compound and permitting these materials to react to produce a cross-linked aluminum oxide polymer and an alcohol. The aluminum included in the aluminum oxide polymer which is formed is more or less cationic, depending on the proportions of water and aluminum alkoxide which are reacted with the polycarboxylic acid, and also the number of carboxyl functional groups which are present in the polycarboxylic acid. The reaction is preferably carried out in an inert solvent for reasons hereinafter discussed, and after, or near the completion of, the reaction, the solvent and the by-product alcohol are removed from the reaction mixture, preferably by sparging with an inert gas. Prior to the completion of the removal of the solvent and alcohol by sparging, a small amount of paraffin wax is added to the reaction mixture to obtain the benefit of the dispersing action of continued sparging. In other words, by completing the sparging of the volatile solvent and alcohol from the reaction mixture after a small amount of the wax has been added thereto, the polymeric aluminum compound which is frequently insoluble in the wax may be effectively dispersed therein by the sparging action.

As will be more specifically shown by particular examples hereinafter set forth, the wax additive prepared in accordance with the process of the present invention do not detrimentally affect the fluidity of the wax in which they are incorporated and improve the tensile strength and hardness of the wax to an extent which is comparable to the improvement attained when monobasic fatty acid salts of aluminum, such as the commonly used aluminum stearate, are employed.

From the foregoing broad general description of the invention, it will have become apparent that it is an object of the present invention to provide a paraffin wax additive which improves the hardness and tensile strength of the wax to which it is added, yet which does not cause the waxes in which it is incorporated to gel.

An additional object of the present invention is to provide a process for preparing improved paraffin wax compositions, in which process the polymeric reaction products of polycarboxylic acids, water and aluminum alkoxides are used in a new and useful way.

Other objects of the invention will become apparent as the following detailed description of the invention is considered in conjunction with the working examples of its practice which are set forth hereinafter.

The conditions under which the prescribed reactants produce the cross-linked aluminum oxide polymer which is added to the wax are not particularly critical nor severe, and the reaction proceeds well at room temperature and atmospheric pressure. However, for purposes of expediting the reaction and for improving the facility with which a base additive may be prepared for addition to larger amounts of paraffin wax, it is preferred to conduct the reaction at temperatures in the range of from about 30° C. to 100° C. The preferred temperature range is selected in part in order to operate below the boiling points of typical inert hydrocarbon solvents in which the reaction may be carried out, and in part to be above the melting point of the paraffin wax which will be subsequently added to the reaction mixture in the manner above suggested and hereinafter described in detail.

The reaction is preferably, as indicated, carried out in a diluent comprising an inert or indifferent hydrocarbon solvent. As examples of suitable inert hydrocarbon solvents which may be used as a diluent medium for conducting the reaction, xylene, toluene, iso-octane, kerosene and petroleum naphtha fractions may be mentioned.

In addition to the water which is used in the reaction, a number of widely varying types of aluminum alkoxide compounds and polycarboxylic acids may be employed. As previously indicated herein, aluminum alkoxides in which the alkyl groups contain between 1 and 40 carbon atoms may be employed, but for economic and other practical considerations, it is preferable to employ compounds in which R is a lower alkyl group containing from 3 to 16 carbon atoms. The alkyl groups may be of the straight or branched chain types. It is also to be noted that each of the alkoxy substituents of the aluminum atom may differ and need not be identical. In other words, the aluminum alkoxide reactants may be broadly represented by the structural formula:

wherein $R_1$, $R_2$ and $R_3$ are alkyl groups containing between 1 and 40 carbon atoms and may be the same or different. Examples of suitable aluminum alkoxide compounds which may be used in the invention include, but are not limited to, aluminum triethoxide, aluminum tripropoxide, aluminum triisopropoxide, aluminum triisobutoxide, aluminum trihexoxide, aluminum tri-2-ethylhexoxide, aluminum dipropoxideisobutoxide, aluminum tridodecoxide, aluminum tri-4-ethyleicosoxide, aluminum 8-octylhentriacontoxide, 4-methyltritriacontoxide 5-butyl-6-hexylheneicosoxide, aluminum tritetracontoxide, aluminum tritritriacontoxide, and aluminum didecoxide eicosoxide.

A variety of polycarboxylic acids can advantageously be used in the reaction. The polyvalent organic radical to which the plurality of carboxylic acid functional groups are bonded can be aromatic, alicyclic or acyclic. Additionally, these radicals can carry substituents other than the carboxyl groups. Also, unsaturated acyclic polycarboxylic acids as well as such cyclic compounds wherein the unsaturation is non-benzenoid in nature are applicable. Exemplary of a number of organic polycarboxylic acids which may be used in the reaction are adipic acid, pimelic acid, succinic acid, sebacic acid, phthalic acid, hexachlorophthalic acid, isophthalic acid, terephthalic acid, maleic acid, t-butyladipic acid, 3-methylglutaric acid, malonic acid, unsaturated dicarboxylic acids of the type derived from propylene polymerization processes such as docenyl succinic and pentadecenyl succinic, polycarboxylic acids such as thermally polymerized methacrylic acid, copolymers of methacrylic acid and vinyl stearate, copolymers of acrylic acid and 2-ethylhexylacrylate, polymerized fatty acids, dimerized unsaturated fatty acids, and styrenated polycarboxylic acids such as styrenated dodecenyl succinic acid and styrenated pentadecenyl succinic acid. Mixtures of polybasic carboxylic acids can also be used in the reaction.

The relative amounts of the reactants which are used in practicing the invention are subject to some variation, although it is generally preferred to employ one mole each of the water and aluminum alkoxide compound for each neutral equivalent of the polycarboxylic acid used in the reaction. The amount of water used in the reaction may, however, be varied between about 0.5 mole for each neutral equivalent of the acid to about four moles for each neutral equivalent of acid used. The manner of bringing the reactants into contact with each other in carrying out the reaction is not particularly critical except that either the water or the alkoxide should be added last to a mixture of the remaining two reactants. Preferably, the aluminum alkoxide compound is added to a mixture of the water and polycarboxylic acid with an inert diluent of the type hereinbefore described, although the sequence of addition may be reversed and the water added to the alkoxide, acid and diluent mixture. When the alkoxide is to be added to the water and polycarboxylic acid in the preferred mode of practicing the invention, it is preferred to dissolve or disperse the alkoxide in an additional quantity of the inert diluent, although this procedure is not required.

The addition of the aluminum alkoxide compound to the mixture of acid and water is accomplished while the mixture is vigorously stirred or agitated and is preferably carried out relatively slowly although, in general, the speed of addition is not particularly critical and may range from a few minutes to several hours.

As has been previously indicated, the temperature at which the reaction is carried out is subject to wide variation insofar as the operativeness of the process is concerned. However, it will, for practical considerations, be desirable in most instances to carry out the reaction at a temperature which is between the melting point of the molten wax which is to be added in the later stages of the process and the boiling point of the byproduct alcohol or the inert solvent which is utilized as a diluent. Therefore, it is preferred to use a temperature of between about 30° C. and 100° C. This temperature is desirably obtained by initially heating the mixture of acid and water to the desired temperature prior to the addition of the alkoxide reactant thereto.

Upon completion of the addition of the alkoxide reactant to the water-acid mixture accompanied by stirring of the reaction mixture, the temperature of the reaction mixture is brought up to the boiling point of either the alcohol produced in the reaction or the inert diluent, whichever is lower. Upon reaching such temperature, an inert gas is passed through the reaction mixture to sparge therefrom the alcohol and diluent. As sparging of the reaction mixture is continued, and the volume of the mixture is decreased thereby, the temperature of the reaction mixture will increase. After a portion of the alcohol and inert solvent has been stripped from the reaction vessel, as indicated by comparison of the total volume of overhead recovered from stripping with the total amount of solvent originally present, an amount of paraffin wax is added to the reaction mixture which corresponds substantially to the volume of inert solvent and alcohol which has been removed therefrom. Sparging is then continued until a heel temperature is attained which is indicative of the removal of substantially all of the volatile components, i.e, the alcohol and solvent, from the reaction mixture. Preferably, an amount of wax is incorporated in the reaction mixture prior to the completion of the sparging which is sufficient to produce a composition upon completion of the sparging which contains approximately 10 percent by weight of aluminum oxide polymer and the remainder consisting essentially of the wax. However, considerably more concentrated blends may be prepared if desired.

The base blend which is produced in the manner described may be diluted by the addition of further amounts of paraffin wax to reduce the concentration of additive therein to any desired level. While the amount of additive which is present in any wax composition will, of course, be dependent upon the overall properties of the wax which are desired and the predominance of the additive characteristics which can be tolerated, worthwhile improvement in the tensile strength and penetration properties of paraffin wax may be expected to occur when as little as one-half percent by weight of the additive is incorporated therein. On the other hand, wax compositions valuable for some applications can contain as much as 15 percent by weight of the additive.

The following are examples of the process as it may be practiced using reactants typical of those hereinbefore enumerated:

EXAMPLE 1

A mixture of 20.6 grams (0.05 mole) of pentadecenyl succinic acid, 7.3 grams (0.05 mole) of adipic acid, 3.6 grams (0.2 mole) of water and 400 milliliters of benzene was warmed to a temperature of 50° C. while blanketing the reaction mixture with an inert atmosphere of nitrogen. To the described mixture was then added a solution of 59.2 grams (0.2 mole) of aluminum triisobutoxide in 250 milliliters of benzene. The addition was accomplished over a period of 20 minutes during which time the reaction mixture was rapidly agitated. A clear gel rapidly developed in the mixture as the aluminum oxide polymer was produced by the reaction.

The reaction mixture was then heated to the temperature at which the benzene therein boiled (80° C.) and sparging was commenced using nitrogen gas to strip the alcohol produced in the reaction and the benzene solvent from the reaction mixture. The sparging was continued until approximately 300 milliliters of the alcohol and solvent was collected. At this time, 300 grams of a molten paraffin wax having a melting point of 123 to 126° F. and an oil content of less than 0.5 percent by weight were added to the reaction mixture and nitrogen sparging was then continued. The stripping was continued until a heel temperature of 150° F. was attained in the reaction mixture. At this point, substantially all of the benzene solvent and alcohol by-product had been removed from the reaction mixture and a wax composition remained which contained approximately 10 percent by weight of the aluminum oxide polymer additive. It was found that the base blend produced by the described procedure could be easily diluted by the addition of molten paraffin wax to any desired additive concentration level without the occurrence of gelling.

EXAMPLE 2

A mixture of 0.05 mole of adipic acid and 0.1 mole of water in 200 milliliters of benzene was warmed to 50° C. under an inert atmosphere of nitrogen. A solution of 0.1 mole of aluminum tri-2-ethylhexoxide in 150 milliliters of benzene was then added to the acid-water mixture over a period of about 10 minutes with rapid agitation. The 2-ethylhexanol produced in the reaction and the benzene were stripped from the reaction mixture by nitrogen sparging.

After about 175 milliliters of the alcohol and solvent were removed, 220 grams of paraffin wax (melting point 123° F.–126° F.) were added to the reaction mixture. Sparging was then continued until a temperature of 150° C. was reached. The stripping was then continued under reduced pressure to a temperature of 175° C. at which point substantially all of the alcohol and solvent were removed. The wax composition remaining in the reaction vessel contained approximately 5 percent by weight of the aluminum oxide polymer.

Several wax compositions prepared by the process of the present invention were tested for tensile strength and hardness and the results of such tests compared with identical tests conducted upon wax containing no additive, and wax containing aluminum stearate in an amount comparable to the amount of the additive employed in the compositions of this invention which were tested. The wax which was employed was the same 123° F. to 126° F. melting point paraffin wax which was utilized in the foregoing examples. The results of penetration and tensile strength tests which were conducted upon the wax compositions prepared in accordance with the present invention and upon the described control compositions are set forth in Table 1.

*Table 1*

| Blend | Reactants | | Weight Percent Additive in Paraffin Wax [1] | ASTM D-1321-61T Needle Penetration at— | | | ASTM D-1320-60T Tensile Strength, p.s.i. |
|---|---|---|---|---|---|---|---|
| | Polycarboxylic Acid | Aluminum Alkoxide | | 77° F. | 90° F. | 105° F. | |
| 1 | Phthalic | Triisobutoxide | 5 | 13 | | | 446 |
| 2 | Dodecenyl succinic | ___do___ | 5 | 18 | 39 | 80 | 243 |
| 3 | Styrenated dodecenyl succinic | ___do___ | 5 | 19 | | | 284 |
| 4 | 50% by wt. pentadecenyl succinic, 50% by wt. adipic | ___do___ | 5 | 17 | 31 | 70 | 387 |
| 5 | Thermally polymerized methacrylic | ___do___ | 5 | 12 | | | 367 |
| 6 | Sebacic [2] | ___do___ | 5 | 17 | 37 | 80 | 361 |
| 7 | Sebacic [3] | ___do___ | 5 | 16 | 38 | 75 | 371 |
| 8 | Adipic | ___do___ | 5 | 16 | | | 295 |
| 9 | Pentadecenyl succinic | ___do___ | 5 | 19 | | | 307 |
| 10 | t-Butyladipic | ___do___ | 5 | 16 | | | 431 |
| 11 | 3-methylglutaric | ___do___ | 5 | 13 | | | 387 |
| 12 | Adipic | Triisopropoxide | [4] <5 | 24 | | | 269 |
| 13 | Isophthalic | Triisobutoxide | 5 | 20 | | | 387 |
| 14 | Maleic | ___do___ | [4] <5 | 12 | | | 351 |
| 15 | 50% by wt. adipic, 5% by wt. dimerized fatty acids product.[5] | ___do___ | 5 | 13 | | | 387 |
| 16 | Copolymer of methacrylic acid and vinyl stearate | ___do___ | 5 | 19 | | | 315 |
| 17 | Copolymer of acrylic acid and 2-ethylhexyl acrylate | ___do___ | 5 | 16 | | | 361 |
| 18 | Adipic | Tri-2-ethylhexoxide | 5 | 17 | | | 368 |
| | Unmodified Paraffin Wax (123° F.–126° F. M.P.) | | | 18 | 45 | 225 | 169 |
| | Paraffin Wax Containing 5% by wt. Aluminum Stearate | | | 17 | 34 | 60 | 254 |

[1] Paraffin wax used in tests had melting point of 123° F.–126° F. and contained less than 0.5% by weight oil.
[2] Aluminum oxide polymer used in blend 6 prepared using about two moles of acid to one mole of water. All other blends prepared using two moles of water to each mole of acid.
[3] Aluminum oxide polymer used in blend 7 prepared by adding water to mixture of acid and alkoxide. In all other blends, polymer made by adding alkoxide to mixture of water and acid.
[4] The polymers used in blends 12 and 14 did not disperse well in the wax and the concentration must be presumed to be something less than 5 percent by weight.
[5] Dimerized fatty acids product derived from unsaturated fatty acids, primarily oleic and having the following properties: Acid value, 180; Saponification No. 185; Neutralization equivalent, 290–390; Specific gravity at 15° C., 0.95; Flash Point, 530° F.; Fire Point, 600° F.; Viscosity at 25° C., 10,000 centistokes.

The results set forth in the table clearly indicate that compositions prepared by the process of the present invention and containing additives of the type herein described in general display penetration and tensile strength properties which are at least equal to, and in most cases, better than, the properties which characterize waxes modified by the addition of aluminum stearate thereto. The improvement in these properties which is afforded by both the addition of aluminum stearate and the additives of the present invention may be appreciated by comparing the results of the tests conducted upon these compositions with the results obtained from identical tests performed upon the unmodified paraffin wax containing no additive of any type.

It should be understood that the present invention is not limited to the specific examples of reactant compounds hereinbefore set forth, but that the spirit and scope of the invention are intended instead to circumscribe all equivalents of such reactants which will occur to those skilled in the art upon consideration of the general principles which underlie the invention. It is also to be anticipated that certain variations in the process steps and conditions hereinbefore suggested by way of example will be perceived by those skilled in the art without the exercise of further inventive faculty. Insofar as all such modifications and innovations do not depart from a dependence upon the basic novel principles herein set forth and defined in the following claims, they are intended to be considered within the spirit and scope of the invention.

What is claimed is:
1. A paraffin wax composition of improved tensile strength and hardness comprising:
(a) at least 0.5 percent by weight of a polymeric material prepared by the process comprising:
(1) adding an aluminum alkoxide compound having the formula

wherein $R_1$, $R_2$ and $R_3$ are alkyl groups each containing between 1 and 40 carbon atoms, to a mixture of water and a polycarboxylic acid with the proportions of the reactants being from about 0.5 mole to about 4 moles of water to each neutral equivalent of acid used, and about 1 mole of the alkoxide for each neutral equivalent of the acid used,
(2) heating the admixture of step (1) to a temperature in the range of from about 30 to about 100° C.,
(b) the remainder consisting essentially of paraffin wax.

2. The method of improving the hardness and tensile strength properties of paraffin wax which comprises adding to said wax an amount in the range of from about 0.5 percent by weight to about 15 percent by weight of a polymeric material prepared by the process comprising:
(a) adding an aluminum alkoxide compound having the formula

wherein $R_1$, $R_2$, and $R_3$ are alkyl groups each containing between 1 and 40 carbon atoms, to a mixture of water and polycarboxylic acid with the proportions of the reactants being from about 0.5 mole to about 4 moles of water to each neutral equivalent of acid used, and about 1 mole of the alkoxide for each neutral equivalent of the acid used,
(b) heating the admixture of step (a) to a temperature in the range of from about 30 to about 100° C.

3. The method claimed in claim 1 wherein $R_1$, $R_2$ and $R_3$ are alkyl groups containing from 3 to about 16 carbon atoms.

4. The method of preparing a paraffin wax composition of improved tensile strength and hardness which comprises:
(a) adding an aluminum alkoxide compound having the structural formula

wherein $R_1$, $R_2$ and $R_3$ are alkyl groups each containing between 1 and 40 carbon atoms to a mixture of water and a polycarboxylic acid with the proportions of the reactants being from about 0.5 mole to about 4 moles of water to each neutral equivalent of acid used, and about 1 mole of the alkoxide for each neutral equivalent of the acid used;
(b) heating the reaction mixture to a temperature in the range of from about 30 to about 100° C.;
(c) removing from the reaction mixture a portion of the alcohol produced in the reaction as a by-product upon said addition;
(d) replacing the alcohol removed from the reaction mixture with a substantially equivalent quantity of paraffin wax; and
(e) removing the remainder of the alcohol from the reaction mixture.

5. The method claimed in claim 4 wherein the reaction is carried out in an inert hydrocarbon solvent and said solvent is removed from the reaction mixture simultaneously with the alcohol.

6. The method claimed in claim 5 wherein the alcohol and solvent are removed from the reaction mixture by sparging with an inert gas.

7. The method claimed in claim 4 wherein the alkyl substituents of said aluminum alkoxide compound contain between 3 and 16 carbon atoms.

8. The method claimed in claim 7 wherein said aluminum alkoxide compound is aluminum triisobutoxide.

9. The process of preparing a paraffin wax composition of improved tensile strength and hardness which comprises:
(a) adding, with stirring, an inert solvent solution of an aluminum alkoxide compound having the structural formula

wherein $R_1$, $R_2$ and $R_3$ are alkyl radicals containing between 3 and 18 carbon atoms, to a mixture of an inert solvent, water and a dicarboxylic acid, the mole ratio of water to acid equivalent being from about 0.5:1 to about 4:1, and the mole ratio of the added alkoxide to acid equivalent being about 1:1;
(b) warming the reaction mixture to a temperature between the boiling point of the alcohol produced in the reaction and the paraffin wax to be used in the composition;
(c) upon completion of the reaction, stripping from the reaction a portion of the inert solvent and alcohol produced by the reaction;
(d) adding to the reaction mixture an amount of the paraffin wax to be used in the composition sufficient to achieve a weight ratio of about 1:19 of the aluminum oxide reaction product to wax; then
(e) stripping the remaining alcohol product and inert solvent from the reaction mixture.

10. The process claimed in claim 9 wherein the mole ratio of water to acid equivalent used in the reaction is about 1:1.

11. The process claimed in claim 9 wherein the acid used in the reaction is polymerized methacrylic acid and the aluminum alkoxide compound is aluminum triisobutoxide.

References Cited by the Examiner
UNITED STATES PATENTS

| 2,774,689 | 12/1956 | Orthner et al. | 106—271 XR |
| 2,801,190 | 7/1957 | Orthner et al. | |
| 3,097,957 | 7/1963 | Slotterbeck et al. | 106—285 |

FOREIGN PATENTS 215,590 2/1956 Australia.

ALEXANDER H. BRODMERKEL, Primary Examiner.
J. B. EVANS, Assistant Examiner.

UNITED STATES PATENT OFFICE
CERTIFICATE OF CORRECTION

Patent No. 3,288,620                        November 29, 1966

Richard F. Lippoldt

It is hereby certified that error appears in the above numbered patent requiring correction and that the said Letters Patent should read as corrected below.

Column 3, line 29, for "docenyl" read -- dodecenyl --; columns 5 and 6, Table 1, eighth column, line 18 thereof, for "368" read -- 378 --; column 7, lines 8 to 11, the formula should appear as shown below instead of as in the patent:

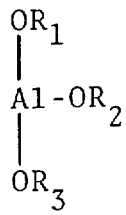

column 7, line 47, for the claim reference numeral "1" read -- 2 --.

Signed and sealed this 24th day of October 1967.

(SEAL)
Attest:

EDWARD M. FLETCHER, JR.　　　　　　　　　　EDWARD J. BRENNER
Attesting Officer　　　　　　　　　　　　　　Commissioner of Patents